(12) United States Patent
Swaine

(10) Patent No.: US 10,489,303 B2
(45) Date of Patent: Nov. 26, 2019

(54) MULTI-RANGE LOOKUP IN TRANSLATION LOOKASIDE BUFFER

(71) Applicant: ARM Limited, Cambridge (GB)

(72) Inventor: Andrew Brookfield Swaine, Cambridge (GB)

(73) Assignee: Arm Limited, Cambridge (GB)

( * ) Notice: Subject to any disclaimer, the term of this patent is extended or adjusted under 35 U.S.C. 154(b) by 630 days.

(21) Appl. No.: 15/066,380

(22) Filed: Mar. 10, 2016

(65) Prior Publication Data

US 2017/0262381 A1    Sep. 14, 2017

(51) Int. Cl.
*G06F 12/1027* (2016.01)
*G06F 12/1009* (2016.01)

(52) U.S. Cl.
CPC ...... *G06F 12/1027* (2013.01); *G06F 12/1009* (2013.01); *G06F 2212/68* (2013.01)

(58) Field of Classification Search
CPC ............. G06F 12/1027; G06F 12/1009; G06F 2212/68
See application file for complete search history.

(56) References Cited

U.S. PATENT DOCUMENTS

| | | | | | |
|---|---|---|---|---|---|
| 5,465,337 | A * | 11/1995 | Kong | ............... | G06F 12/1027 711/206 |
| 5,526,504 | A * | 6/1996 | Hsu | ............... | G06F 12/1027 711/207 |
| 7,895,410 | B1 * | 2/2011 | Wu | ............... | G06F 12/1009 711/203 |
| 8,707,011 | B1 * | 4/2014 | Glasco | ............... | G06F 12/1027 711/118 |
| 2003/0009640 | A1 * | 1/2003 | Arimilli | ............... | G06F 12/0813 711/147 |
| 2006/0047883 | A1 * | 3/2006 | O'Connor | ............... | G06F 12/0864 711/3 |
| 2011/0276778 | A1 * | 11/2011 | Dooley | ............... | G06F 12/1027 711/207 |
| 2013/0238875 | A1 * | 9/2013 | Ramaraju | ............... | G06F 12/1027 711/207 |

OTHER PUBLICATIONS

Jan M. Rabaey, Digital Integrated Circuits: A Design Perspective, Prenticel Hall, Chapter 7 (Year: 1995).*

* cited by examiner

*Primary Examiner* — Rocio Del Mar Perez-Velez
(74) *Attorney, Agent, or Firm* — Leveque IP Law, P.C.

(57) ABSTRACT

There is described a method and data processing apparatus configured to translate a virtual address into a physical address, the virtual address comprising an offset for a memory page, an index and a tag with the memory page having a variable size.

18 Claims, 5 Drawing Sheets

MULTI-RANGE LOOKUP IN TRANSLATION LOOKASIDE BUFFER

The present techniques relate to a translation lookaside buffer (TLB). More particularly, the techniques relate to efficient multiple memory range lookup in a TLB.

BACKGROUND

A known TLB is organised as a fully associative flop based TLB backed up by a set associative RAM based TLB. A fully associative structure is expensive due to the need to compare against all tags simultaneously.

Translations can span multiple memory ranges, for example 4 KB, 64 KB and 2 MB or more. Storing larger translations in a single entry massively reduces the number of TLB entries required for a given application. Each translation size needs its index into the TLB calculated based upon a different set of address bits. If there are n different translation sizes supported by a TLB, in the worst case n lookups are required in order to find it. Known implementations store a hitmap, a bit per possible size, to remember which sizes have been used since the last global invalidate operation, and which therefore need looking up.

DESCRIPTION OF FIGURES

Embodiments will be described with reference to the accompanying figures of which.

SPECIFIC DESCRIPTION

Figure 1:
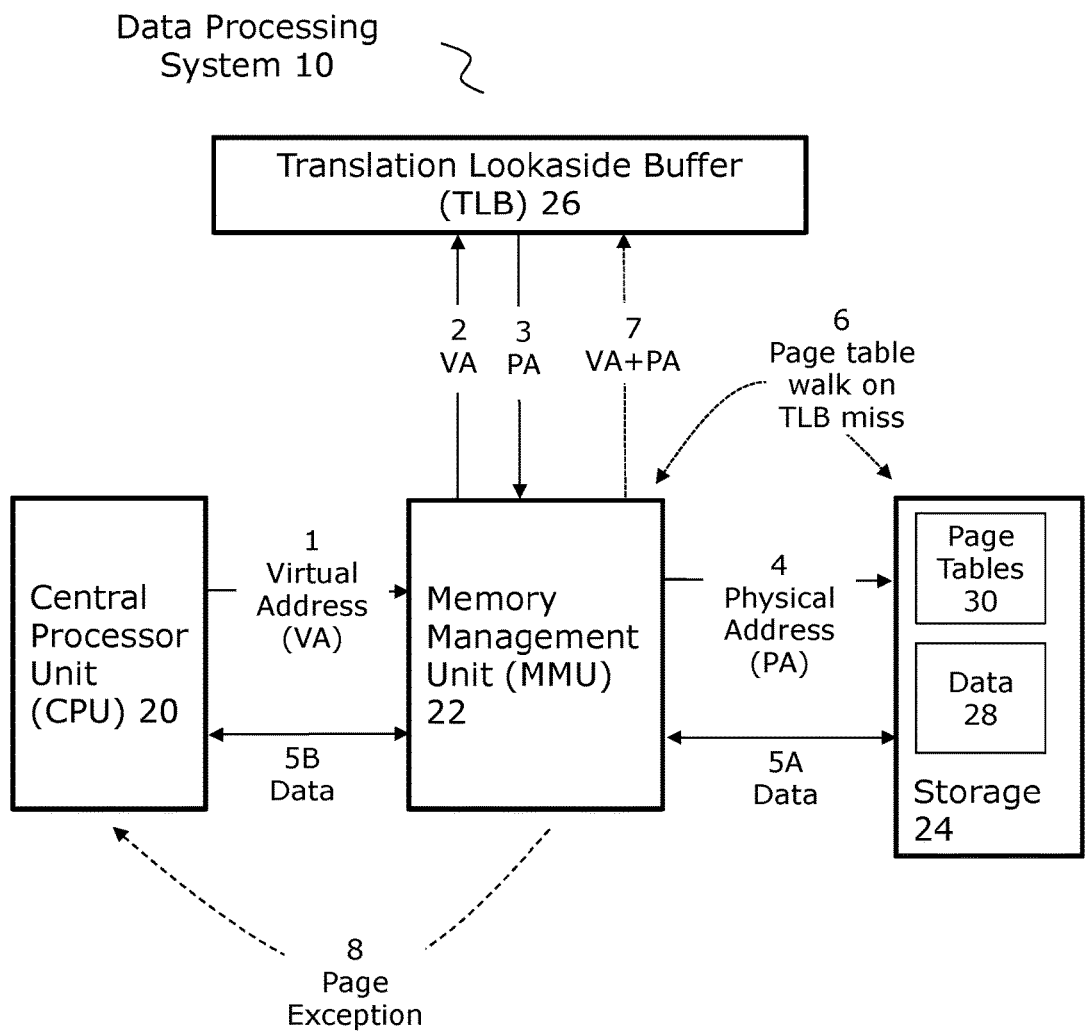
FIG. 1 is a deployment diagram for a translation lookaside buffer (TLB) of an embodiment.

According to a first technique, there is provided data processing apparatus for translating a virtual memory address into a physical memory address, the virtual memory address comprising an offset for a variable size memory page, an index and a virtual tag, the apparatus comprising: a TLB memory array having an indexed plurality of storage elements, each element for storing a physical address page number and an associated tag corresponding to the virtual tag; size register array having an indexed plurality of size registers, each size register corresponding to an element in the memory array and for storing a page size value associated with a physical address page number and tag in the corresponding element, the size register array being adapted for simultaneous indexing; index generation logic for determining possible indices, each possible index corresponding to a possible page size for the virtual memory address; comparison logic for selecting, in parallel, candidate page sizes from stored page sizes in the size register array that match the possible page size corresponding to the determined possible index; lookup logic for looking up a tag and physical address page of a candidate page size in the TLB memory array at the corresponding index; and translation logic for calculating a physical memory address when the looked up tag matches the virtual memory address, the physical memory address being based on the looked up physical address page and an offset of virtual memory address corresponding to the matched possible page size.

According to a second technique there is provided apparatus for data processing configured to translate a virtual address into a physical address, the virtual address comprising an offset for a memory page, an index and a tag, the memory page having a variable size, the apparatus comprising: TLB memory for storing translations, where each translation can be stored in one of a subset of the TLB memory locations, and where the subset of the TLB memory locations is dependent upon the size of the memory page associated with the translation; size registers, where a size register is associated with each TLB memory location, and where a greater number of the size registers can be accessed simultaneously than the TLB memory locations; index generation logic operable to calculate the possible locations where a requested translation might be stored in the TLB memory for each memory page size; size register comparison logic operable to access the size registers associated with each TLB memory location identified by the index generation logic as a possible location for said requested translation, where the size register comparison logic selects filtered TLB memory locations where the accessed size registers indicate that the translation stored at the corresponding TLB memory location matches the size used by the index generation logic to identify the possible location; lookup logic operable upon receiving a translation request to look up entries in the TLB memory and return translations which match the translation request; where the lookup logic accesses only the filtered TLB memory locations.

According to a third technique there is provided a method for translating a virtual memory address into a physical memory address, the virtual memory address comprising an offset for a variable size memory page, an index and a virtual tag, physical address page numbers being stored in a memory array having an indexed plurality of elements, each element for storing a physical address page number and an associated tag corresponding to the virtual tag, memory page size being stored in an associated register array having an indexed plurality of registers, each register corresponding to an element in the memory array and for storing a page size associated with a physical address page number and tag in the corresponding element, the registers being adapted for parallel indexing, the method comprising: determining possible indices, each possible index corresponding to a possible page size for the virtual memory address; selecting, in parallel, candidate page sizes from stored page sizes that match the possible page size corresponding to the determined possible index; looking up a tag and physical address page of a candidate page size in the memory array at the corresponding index; and determining a physical memory address from the tag, physical address page number and respective offset when the selected tag matches the virtual memory address.

According to a fourth technique there is provided a method for translating a virtual address into a physical memory address, the virtual address comprising an offset for a variable size memory page, an index and a virtual tag, physical address page numbers being stored in a memory array having an indexed plurality of elements, each element for storing a physical address page number and an associated tag corresponding to the virtual tag, memory page size being stored in an associated register array having an indexed plurality of registers, each register corresponding to an element in the memory array and for storing a page size associated with a physical address page number and tag in the corresponding element, the registers being adapted for parallel indexing, the method comprising: determining TLB index for each page size from virtual address; looking up size stored at each index in parallel and comparing with the size that generated the index whereby matches are candidates; returning a TLB miss when there are no candidate sizes that have not been looked up; looking up tag and data of the smallest candidate size that has not been looked up; and determining a physical address from the selected cache data when the tag matches the virtual address and returning a TLB hit otherwise performing looking up tag and data if there are further candidate sizes that have not been looked up.

Referring to FIG. 1, an illustrative data processing system 10 comprises: central processing unit (CPU) 20; memory management unit (MMU) 22; storage 24; and translation lookaside buffer (TLB) 26.

Data processing system 10 is operational with numerous other general purpose or special purpose computing system environments or configurations. Examples of well-known computing processing systems, environments, and/or configurations that may be suitable for use with data processing system 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices. A distributed computer environment includes a cloud computing environment for example where a computer processing system is a third party service performed by one or more of a plurality computer processing systems. A distributed computer environment also includes an Internet of things computing environment, for example, where data processing systems are distributed as a network of objects that can interact with a computing service. In this embodiment the data processing system components are shown as separate components but can be embodied as a single system on a silicon chip; as separate components on separate silicon chips; or as a combination of separate silicon chips.

Central processing unit (CPU) 20 is for executing instructions included in: routines; programs; objects; components; logic; and data structures that perform particular tasks or implement particular abstract data types.

Memory management unit (MMU) 22 is for managing memory transfer between storage 24 and CPU 20. In particular, MMU 22 translates between virtual memory address pages used by CPU 20 and physical memory address pages used by storage 24.

Storage 24 comprises dynamic random access memory (DRAM) for storage of data 28 for access by CPU 22. The embodiments have page sizes varying from 4 KB to 128 MB and more. Storage 24 also stores page tables 30 for translating virtual memory addresses into physical memory addresses; when a faster translation is not possible using TLB 26 then a comprehensive translation is performed by page walking over several stored page tables. Such a page walking operation takes several memory fetches but it is more reliable than a single TLB lookup.

Translation lookaside buffer (TLB) 26 is for faster translation of a virtual memory address into a physical memory address by storing a previous page walked translation in memory that may be accessed as a single memory fetch (rather than having to perform several memory fetches per address by page walking). TLB 26 is typically implemented using on-chip static random access memory (SRAM).

A typical CPU 20 memory read operation starts, for example, with a virtual memory address (VA) data read request (step 1). MMU 22 forwards (step 2) the data request to TLB 26 which looks up the VA in an array and translates the VA into a physical memory address (PA) before sending it back (step 3) to MMU 22 (unless a PA is not found—see TLB miss below). MMU 22 then sends (step 4) a PA data request to storage 24 which returns the requested data to MMU 22 (step 5A) and ultimately to CPU 20 (step 5B).

Matters are complicated when TLB 26 cannot find a translation and a TLB miss occurs. If there is a miss, then MMU 22 reads page tables 30 in storage 24 to determine the translation, and having done so, uses the translation to create the correct downstream transaction and sends an update (step 6 and 7) to the TLB 26 with both VA and PA information. Matters are further complicated if MMU cannot find a page and a page exception occurs (step 8) where CPU 20 is notified.

The embodiments are concerned with TLB 26 and a virtual address (VA) to physical address (PA) translation look up. When page sizes are not all the same then there is more than one possible size, VA offset and VA index to consider (in the described examples there are five different candidate sizes).

Figure 2:
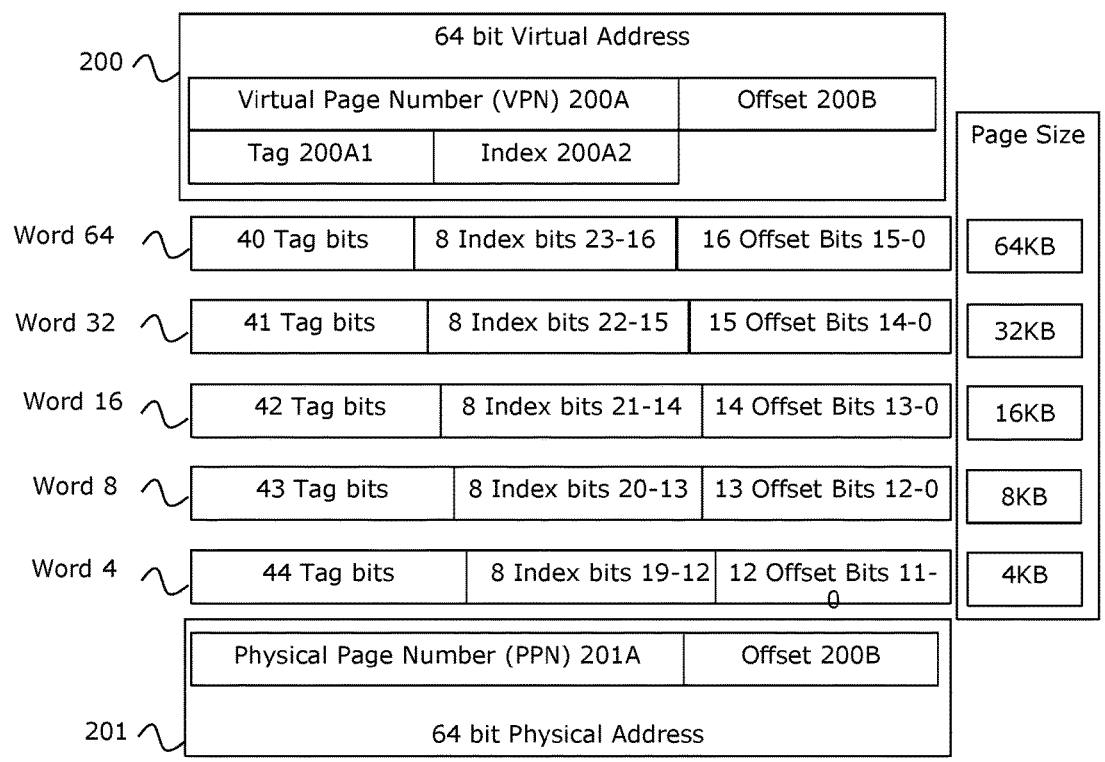
FIG. 2 is a data diagram showing possible arrangements of offset bits, index bits and tag bits in a virtual memory address for different memory page sizes used in a TLB of an embodiment.

Referring to FIG. 2, a schematic bit diagram showing different arrangements of words used in a TLB of an embodiment. Words comprising offset bits, index bits and tag bits for different memory page sizes are described.

Word 200 is a 64 bit virtual address used as an example, smaller or bigger word sizes could be used in other embodiments. Word 200 comprises a virtual page number (VPN) 200A and an offset 200B whereby VPN 200A is the address of a page in virtual address space and the corresponding offset 200B is the number of bytes offset from the page start. Offset 200B is 12 to 16 bits long depending on the page size. VPN 200A comprises a tag part 200A1 and an index part 200A2. In the embodiments, the physical page size can be varied and therefore the offset size varies to address all the entries in the variable page size. An example word in pseudo hex is U5518002 where U represents 41 of the most significant bits that are not defined in the example. The equivalent pseudo binary example is U0101000100001000000000000010 (see FIG. 5). The undefined part U is for simplification of the example only and all the bits would be defined and stored in a working embodiment. Word 200 comprises differently arrangements for different page sizes: word 64; word 32; word 16, word 8; and word 4.

Figure 5:
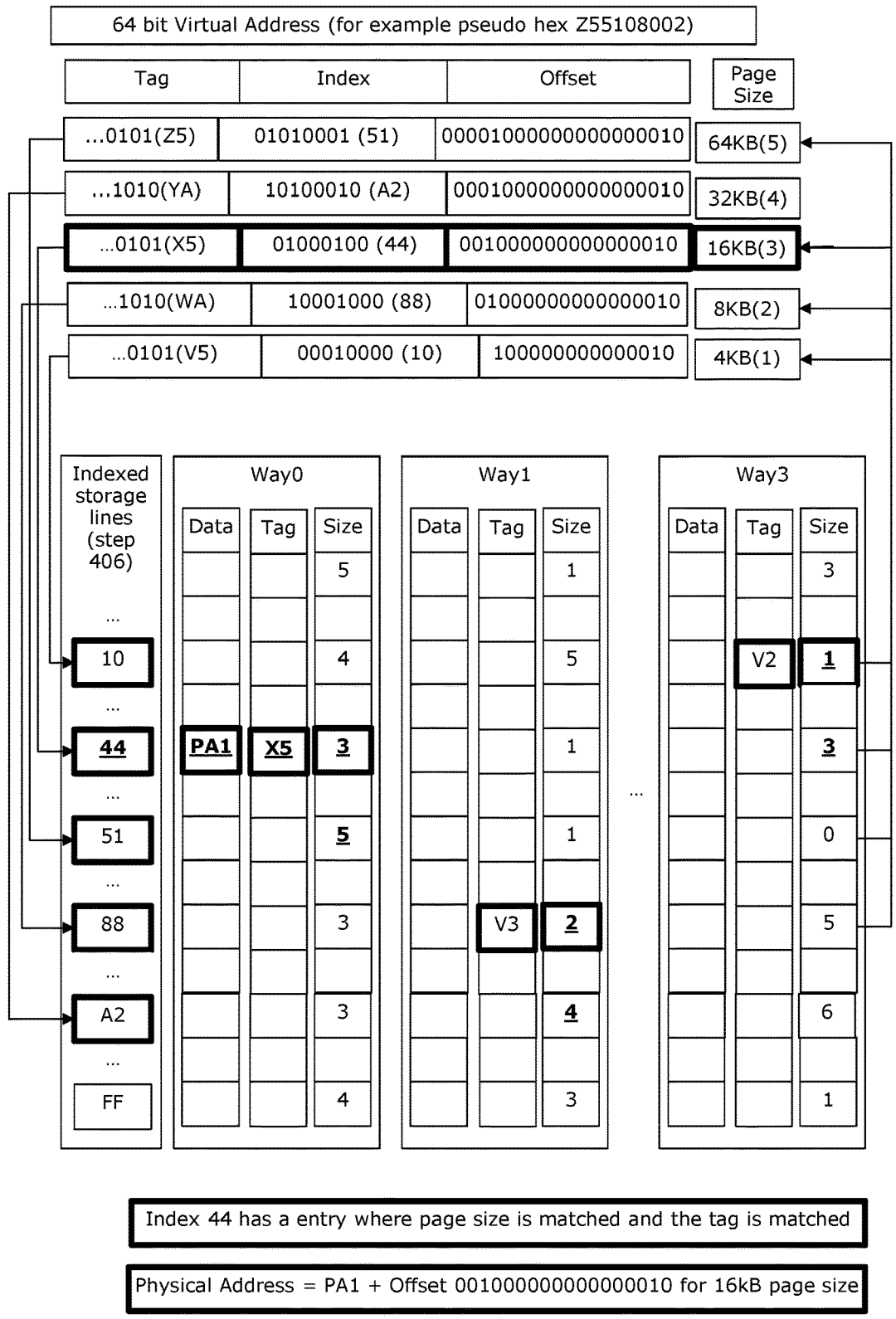
FIG. 5 is a schematic example of a TLB translation of a virtual memory address into a physical memory address.

Word 64 is for a 64 KB page where the offset is 16 bits long ($2^{16}$=65536 addressable memory locations) and binary 0000100000000000010 in the example (see FIG. 5). Bits 15-0 are for the offset. Bits 23-16 are for the 8 bit index, for example, binary 01010001 (51 hex). 40 tag bits remain, for example, hex Z5 where Z is 36 undefined most significant bits and 5 is the hex for four least significant bits.

Word 32 is for a 32 KB page wherein the offset is 15 bits long ($2^{15}$=32768 addressable memory locations). Bits 14-0 are for the offset and binary 000100000000000010 in the example. This offset is one bit smaller than the 64 KB offset and the most significant bit from the 64 KB offset is now part of the 32 KB index. Bits 22-15 are for the 8 bit index, for example binary 10100010 (hex A2) where the least significant bit was the most significant bit of the 64 KB offset. 41 TLB tag bits remain, for example, pseudo hex YA where Y is 37 undefined most significant bits.

Word 16 is for a 16 KB page wherein the offset is 14 bits long ($2^{14}$=16384 addressable memory locations). Bits 13-0 are for the offset and binary 001000000000010 in the example. Bits 21-14 are for the 8 bit index, for example binary 01000100 (hex 44). 42 tag bits remain, for example, pseudo hex X5 where X is 38 undefined most significant bits.

Word 8 is for an 8 KB page wherein the offset is 13 bits long ($2^{13}$=8192 addressable memory locations). Bits 12-0 are for the offset and binary 01000000000010 in the example. Bits 20-13 are for the 8 bit index, for example, 10001000 (hex 88). 43 tag bits remain, for example pseudo hex WA where W is 39 undefined most significant bits.

Word 4 is for a 4 KB page wherein the offset is 12 bits long ($2^{12}$=4096 addressable memory locations). Bits 11-0 are for the offset, for example, 1000000000000010. Bits 19-12 are for the 8 bit TLB index, for example, 00010000 (hex 10). 44 tag bits remain, for example, pseudo hex V5 where V is the 40 undefined most significant bits.

Word 201 is a 64 bit physical address comprising a physical page number (PPN) 201A and offset 200B whereby PPN 201A is the address of a page in physical address space and the corresponding offset is the number of bytes from the PPN.

Figure 3:
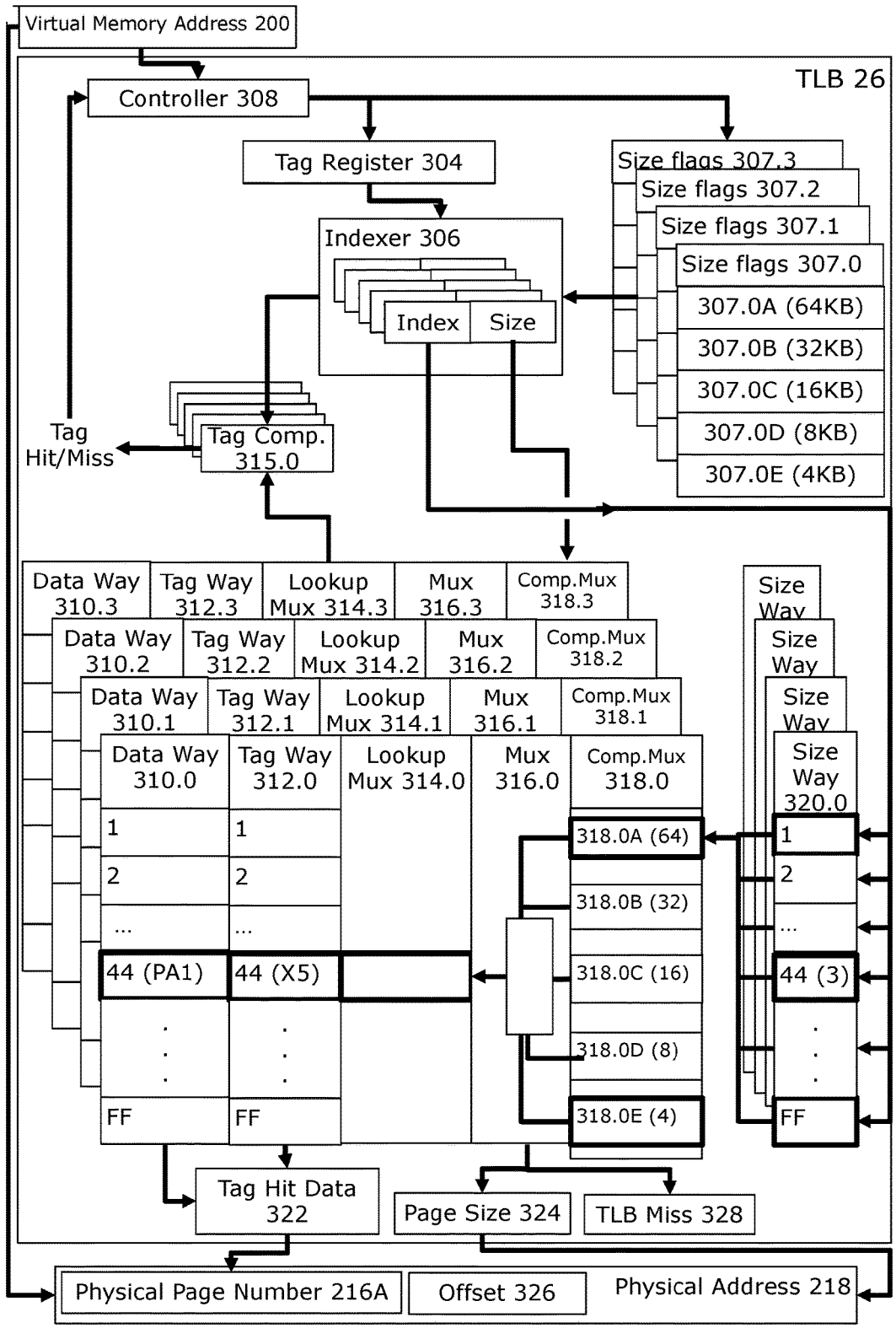
FIG. 3 is a component diagram of a TLB according to an embodiment.

Referring to FIG. 3, an embodiment comprising TLB 26 is described. TLB 26 comprises: tag register 304; indexer 306; size flags 307 (307.0A to 307.3E); controller 308; RAM based set associative data storage 310 (310.0.1 to 310.3.FF); RAM based set associative tag storage 312 (312.0.1 to 312.3.FF); lookup multiplexer 314 (314.0 to 314.3); tag comparators 315 (315.0 to 315.3); multiplexers 316 (316.0 to 316.3); comparator multiplexer 318 (318.0A to 318.3E) and flop based set associative size storage 320 (320.0.1 to 320.3.FF). The associative storage in this embodiment is based on 256 indexed data elements, tag elements, size elements in 4 ways; the number of indexed elements and number of ways may be different in other embodiments.

Tag register 304 is for storing the virtual memory address 200 whereby indexer 306 uses different bits of the tag for different sizes.

Indexer 306 is for determining possible indices, each possible index corresponding to a possible page size for the virtual memory address. It can also determine corresponding tags, offsets and sizes from virtual memory address 200 for each of the five (in this example) page sizes (4 KB, 8 KB, 16 KB, 32 KB, and 64 KB). Possible tags are output to tag comparators 315; possible indices are output to size storage 320; and possible sizes are output to comparator multiplexer 310.0A to 318.3E. Referring back to FIG. 2, the precise bit positions of the possible indices for five respective pages sizes is defined (for instance bits 21 to 14 for a 16 KB page size) and referring to FIG. 5, corresponding examples of 8 bit indices for fives respective page sizes are shown (for instance binary 01000100 or hex 44).

Size flags 307 (307.0A to 307.3E) are for storing a bit indicating that a candidate size is selected by storing a "1" value. Sizes are deselected as candidates by storing a null value. Initially all sizes are included in each candidate set but after a first cycle of tag lookups then one or more possibilities are deselected from a set by storing a null value. Each way has its own set of size flags so deselection of candidates can operate independently. Another embodiment uses one set of size flags (say 307A to 307E) for all ways whereby the ways operate more dependently. In another embodiment, size flags are not used and sizes are deselected in indexer 306 by controller 308.

Controller 308 is for starting a first cycle and subsequent cycles of virtual memory address translation. A first cycle starts when conversion of a new virtual memory address 200 is requested. Subsequent cycles are started after a tag lookup does not find a matching tag in the tag storage (a tag miss) and the subsequent cycle is performed after deselecting the missed size from size flags 307.

Data storage 310 (comprising data ways 310.0 to 310.3 and data elements 310.0.0 to 310.3.FF) are part of a set associative storage array and are for storing physical page numbers that have been previous located from page walks. Data ways 310.0 to 310.3 can be addressed by a single index (one of 0 to 255) such that an index (for example value AA) applied to the data way will select the same corresponding element in the all data ways (for example elements 310.0.AA, 310.1.AA, 310.2.AA and 310.3.AA) or addressed independently when there are different candidate indices in different ways. In a variant the different ways can be operated so that they are addressed only by the same index.

Tag storage 312 (comprising tag ways 312.0 to 312.3 and tag elements 312.0.0 to 312.3.FF) are also part of the set associative storage array and are for storing tags associated with the physical page numbers. Tag storage 312 is addressed by a single index (one index between 0 to 255) that addresses the tag ways (for example value AA) such that when an index is applied to the tag ways the same corresponding locations in the tag ways will be selected (for example elements 312.0.AA, 312.1.AA, 312.2.AA and 312.3.AA). Tag storage 312 comprises random access memory for storing 256 data lines in 4 ways addressable by the index.

Size storage 320 (comprising size storage ways 320.0 to 320.3 and size storage elements 320.0.0 to 320.0.FF) are also part of the set associate storage array and are for storing the page size of the physical page number. Size storage is set associative and based on flip flop logic such that size ways 320.0 to 320.3 are simultaneously addressable by a plurality of indices in parallel (one or more of 0 to 255). Size storage 320 is for selecting, in parallel, stored page sizes stored in TLB, each stored page size corresponding to a determined possible index. For instance, if several indices are applied (for example from index registers 305.0A to 305.0E containing calculated index values 10, 44, 51, 88, A2, FF) to the size storage way 320.0 then parallel array elements will be selected (for example 320.0.10, 320.0.44, 320.0.51, 320.0.88, 320.0.A2 and 320.0.FF) and in this embodiment compared, in parallel, with the page sizes that generated the indices (for example from size registers 307.0A to 307.0E containing calculated size values 4, 8, 16, 32 and 64 KB). The flip flop logic of size storage 320 needs four bits of storage for referencing fifteen unique page sizes. Other embodiments are envisaged with two, three, five or more bits of flip flop storage.

Comparator multiplexers 318 comprise comparator multiplexer ways 318.0 to 318.3 and comparator multiplexer gates 318.0A to 318.3E, each comparator multiplexer gate has a designated page size. Each comparator multiplexer gate is for taking, in parallel, all selected page size outputs and comparing with the designated page size of the comparator multiplexer. If there is a match then that comparator multiplexer has selected an index for a page size that matches a corresponding stored page size and this index is for a candidate page size that is likely to be the correct page size and index for the physical address in the TLB. Each comparator multiplexer gate is connected to all outputs of the size ways for selecting the size of the index candidates. The comparator multiplexor gates is therefore for selecting, in parallel, candidate page sizes from selected stored page sizes that match the possible page size corresponding to the determined possible index and for providing the selected indices as input to multiplexers 316.0 to 316.3.

Multiplexers 316 (comprising multiplexers 316.0 to 316.3) are for selecting a single index from the candidate indices so that one selected index (per way) is input to lookup multiplexers 314.0 to 314.3. For example multiplexer 316.0 has selected index in comparator multiplexer 318.0A in FIG. 3 and FIG. 5 with a calculated index value of hex 44 for a page size of 64 KB. The selection mechanism of this embodiment is lowest page size first such that the index with the smallest page size match is selected first. Other embodiments may select indices by most recently matched page size(s), or a combination.

Lookup multiplexers 314 (314.0 to 314.3, one multiplexer per way) are for returning the selected tags to tag comparators 315.0 to 315.3. Each lookup multiplexer is for looking up a TLB tag and physical address page of a candidate page size at the corresponding index in the tag storage 312 and data storage 310. In an example embodiment the data is looked up at the same as the tag time for speed although it will only be used if the tags match for a TLB hit. In other embodiments, the data is looked after a TLB hit for more efficiency.

Tag comparators 315 (315.0 to 315.3 one multiplexer per way) are for, once per cycle per way, comparing the returned tags against the stored tag for a TLB hit if there is a match. Each tag comparator is for comparing a returned tag to a tag determined from the virtual memory address for the candidate page size under comparison. If stored tag does not match the determined tag then a tag miss has occurred and controller 308 is notified to start another cycle. If the stored tag does match the determined tag then a tag hit (also known as a TLB hit) has occurred.

Tag hit data 322 is for the physical page number 216A corresponding to the matched tag.

Page size 324 is for the matched page size of the matched tag.

Offset 326 is for an offset determined from the virtual memory address using the matched page size 324.

TLB Miss 328 is a flag for indicating a TLB miss.

Translated physical address 218 comprises a combination of tag hit data 322 and determined offset 326.

Figure 4:
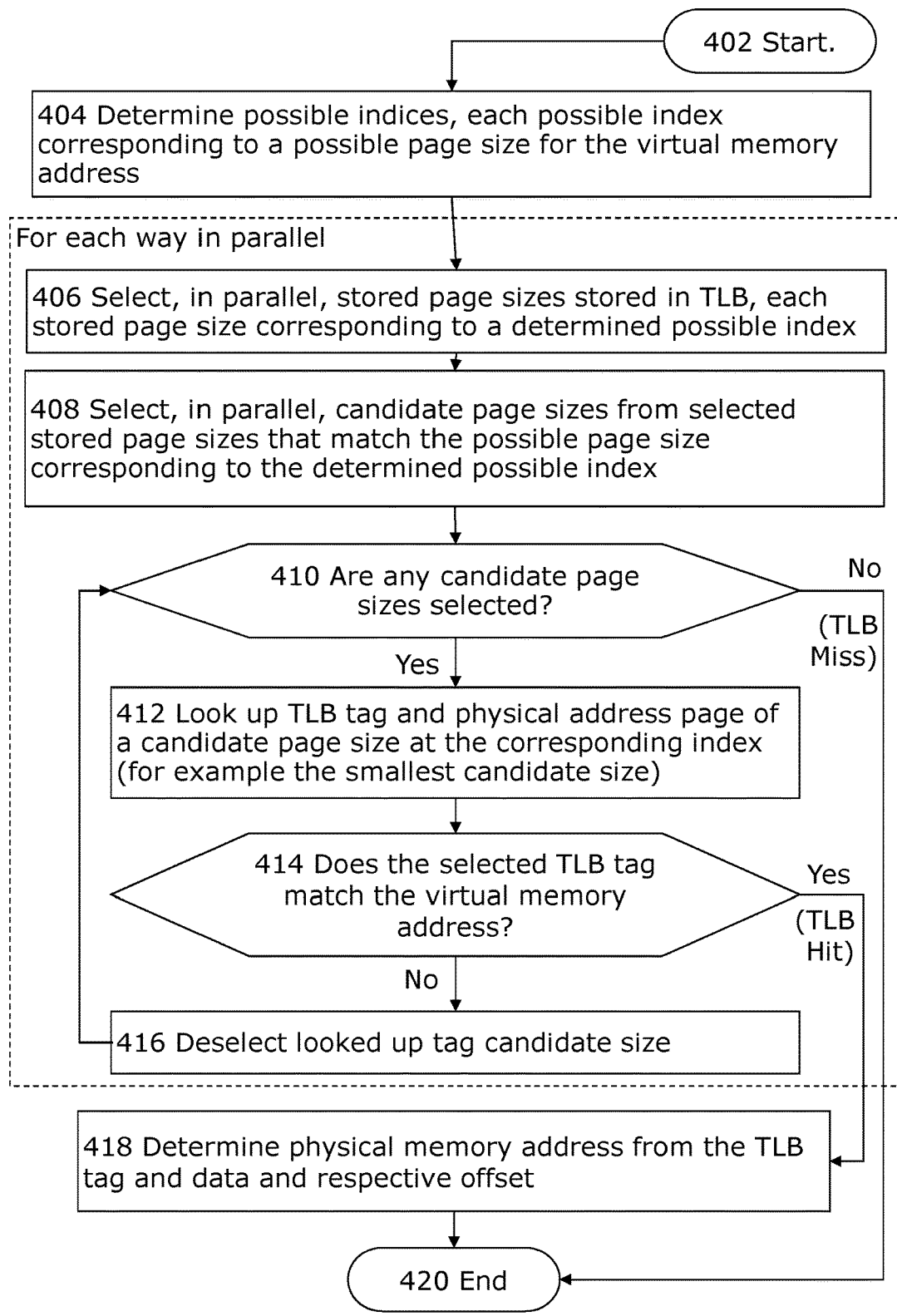
FIG. 4 is a method diagram of a TLB process according to an embodiment.

Referring to FIG. 4, a method of an embodiment is described with respect to blocks 402 to 418.

Block 402 is the start of the method when a translation of a virtual memory address is requested from an MMU.

Block 404 is for determining possible indices, each possible index corresponding to a possible page size for the virtual memory address, see FIGS. 2 and 5 for examples. For a 64 KB page, bits 23-16 are for the 8 bit TLB index and 40 TLB tag bits remain. For a 32 KB page, bits 22-15 are for the 8 bit TLB index and 41 TLB tag bits remain. For a 16 KB page, bits 21-14 are for the 8 bit TLB index and 42 TLB tag bits remain. For an 8 KB page, bits 20-13 are for the 8 bit TLB index and 43 TLB tag bits remain. For a 4 KB page, bits 19-12 are for the 8 bit TLB index and 44 TLB tag bits remain.

The following recitations are performed independently in each way in parallel.

Block 406 is for selecting, in parallel, stored page sizes stored in TLB, each stored page size corresponding to a determined possible index. Each page size storage element is individually addressable so that a plurality of indices can be selected in parallel (in the example five different indices for five different page sizes).

Block 408 is for selecting, in parallel and for each way, candidate page sizes from selected stored page sizes that match the possible page size corresponding to the determined possible index.

Block 410 is for branching to block 412 when there are selected candidate page sizes. When there are no selected candidate page sizes then a TLB miss has occurred and the method branches to block 420.

Block 412 is for looking up a TLB tag and physical address page of a candidate page size at the corresponding index. In the example embodiment the candidate page size is chosen as the smallest candidate size because, in most applications smaller page sizes are most common, but any candidate size can be chosen. A physical address page can be fetched at the same time as the tag lookup for maximum speed. The physical address page can be fetched after the tag lookup to minimize the workload.

Block 414 is for branching to block 418 if the selected TLB tag matches the tag of the virtual memory address for the candidate page size. This would be a TLB hit. If there is no match then block 416. Block 416 is for deselecting the looked up tag candidate size. In the example embodiment, each way has its own candidate sizes and different candidate sizes can be deselected in different ways. The method continues at block 410 and looks up another candidate page size until there are no more candidate page sizes.

Block 418 is for determining a physical memory address from the TLB hit data and respective offset determined using the page size of the TLB hit.

Block 420 is the end of the method of FIG. 4.

Referring to FIG. 5, a schematic example of a translation of a virtual address into a physical page number of an embodiment is described.

Possible tag, index and offset values have been calculated from a 64 bit virtual address for five different page sizes (block 404). Only a portion of the full 64 bit binary number is shown for simplicity. The 16 bit offset for a 4 KB page size is binary 1000000000000010 (hex 8002); these 16 bits are the same for each of the large page sizes but the offset size increases by one most significant bit for each doubling of the page size. Therefore the calculated binary offsets for the following page sizes have bits additional to the 4 KB sixteen bit offset: the 8 KB offset has an extra binary bit 0; the 16 KB offset has two extra binary bits 00; the 32 KB offset has three extra binary bits 000; and the 64 KB offset has 4 four extra binary bits.

The index values are eight bits for every page size and the difference is that the least significant bit is lost and the bits are shifted right one bit for every page size increase. In the example the 4 KB index value is binary 0001000 for address the hex 10 index; the 8 KB index value is binary 10001000 for addressing the hex 88 index; the 16 KB index value is binary 01000100 for addressing the hex 44 index; the 32 KB index value is binary 10100010 for addressing the hex A2 index; and the 64 KB index value is binary 01010001 for addressing the hex 51 index.

Only a portion of the tag values is shown in this example to show how the least significant bit is lost for every page size increase. Values V, W, X, Y and Z represent undefined bits in the tag and the four least significant bits are shown to illustrate how the tag bits are shifted right towards the least significant bit. Hence the values are not hexadecimal but a pseudo hexadecimal for illustrative purposes. In the example, the 4 KB tag value is V5; the 8 KB tag value is WA; the 16 KB tag value is X5; the 32 KB tag value is YA; and the 64 KB tag value is Z5.

The tag and index values for the 16 KB page size calculation are in bold to show that ultimately that this is the tag calculation that matches the page size assumption and the stored tag and therefore it is the associated data that is used for the physical page number.

The example shows simultaneously indexing of multiple size elements with set of possible indices and associated page sizes for each size register way (block 406) whereby storage lines 10; 44; 51; 88; and A2 are selected for way 0; way 1; way 2; and way 3. Way 2 is not illustrated and in any case there may be fewer or more ways depending on the embodiment.

The example shows selecting an index where an indexed register page size matches the associated possible page size (block 410) by underlining in bold the size elements that match the associated size of the index. In the example: index 10 has a matched 4 KB page size (1) in way 3; index 44 has a matched 16 KB page size (3) in way 1 and way 3; index line 51 has a matched 64 KB page size (5) in way 0; index line 88 has a matched 8 KB page size (2) in way 1; and index line A2 has a matched 32 KB page size (4) in way 1. Furthermore, the example shows that one matched index per way (from the one or more matched indices) is selected with a bold box. Index line 44 is selected in way 0; line 88 is selected in way 1; and index line 10 is selected in way 4 as indicated by the bold box around the size element.

The example shows looking up a tag in a selected memory array element for the selected indices (block 412) by highlighting the stored tag with a bold box. Tag value X5 is fetched on index line 44 in way 0; tag value V3 is fetched on index line 88 in way 1; and tag value V2 is fetched in index line 10 on way 4; all indicated by the bold box around the tag element.

The example shows fetching (block 418) a corresponding physical address page (PA1) when the looked up tag (X5) matches the calculated tag (X5) for the selected index 44 wherein a translated physical memory address comprises the fetched physical address page PA1 and the offset binary 001000000000000010 for a 16 kB page size.

As will be appreciated by one skilled in the art, the present techniques may be embodied as a system, method or computer program product. Accordingly, the present techniques may take the form of an entirely hardware embodiment, an entirely software embodiment, or an embodiment combining software and hardware.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language).

In accordance with the foregoing, some aspects and features of the disclosed embodiments are set out in the following numbered items:

1. Data processing apparatus for translating a virtual memory address into a physical memory address, the virtual memory address comprising an offset for a variable size memory page, an index and a virtual tag, the apparatus comprising:

a TLB memory array having an indexed plurality of storage elements, each element for storing a physical address page number and an associated tag corresponding to the virtual tag;

size register array having an indexed plurality of size registers, each size register corresponding to an element in the memory array and for storing a page size value associated with a physical address page number and tag in the corresponding element, the size register array being adapted for parallel indexing;

index generation logic for determining possible indices, each possible index corresponding to a possible page size for the virtual memory address;

comparison logic for selecting, in parallel, candidate page sizes from stored page sizes in the size register array that match the possible page size corresponding to the determined possible index;

lookup logic for looking up a tag and physical address page of a candidate page size in the TLB memory array at the corresponding index; and translation logic for calculating a physical memory address when the looked up tag matches the virtual memory address, the physical memory address being based on the looked up physical address page and an offset of virtual memory address corresponding to the matched possible page size.

2. Data processing apparatus according to item 1 further comprising a controller for, when the looked up tag does not match the tag in the virtual memory address, deselecting the candidate page size for the looked up tag and having the look up logic performing lookup again for another candidate page size.

3. Data processing apparatus according to item 1 further comprising two or more memory array ways, associated register arrays, comparison logic and lookup logic operating in parallel and adapted to provide the physical address page value.

4. Data processing apparatus according to item 3 wherein each memory array way is adapted to operate independently whereby different candidate page sizes can be used for tag lookup and deselected in each parallel operation.

5. Data processing apparatus according to item 1 wherein the data processing apparatus is a translation lookaside buffer in a central processing unit memory management unit.

6. Data processing apparatus according to item 1 wherein the data processing apparatus is a translation lookaside buffer in a standalone memory management unit.

7. Data processing apparatus according to item 1 wherein the size register array comprises bits for all possible page size.

8. Data processing apparatus according to item 1 wherein a selected page size can be 4 KB requiring 12 offset bits, 8 KB requiring 13 offset bits or $2^N$ KB requiring 10+N offsets bits, optionally having an upper limit of 128 MB page size requiring a 27 bit offset.

9. Data processing apparatus according to item 1 whereby each size register is a flip flop circuit.

10. Data processing apparatus according to item 1 wherein the size register array is implemented in a RAM structure with multiple read ports.

11. Apparatus for data processing configured to translate a virtual address into a physical address, the virtual address comprising an offset for a memory page, an index and a tag, the memory page having a variable size, the apparatus comprising:

TLB memory for storing translations, where each translation can be stored in one of a subset of the TLB memory locations, and where the subset of the TLB memory locations is dependent upon the size of the memory page associated with the translation;

size registers, where a size register is associated with each TLB memory location, and where a greater number of the size registers can be accessed simultaneously than the TLB memory locations;

index generation logic operable to calculate the possible locations where a requested translation might be stored in the TLB memory for each memory page size;

size register comparison logic operable to access the size registers associated with each TLB memory location identified by the index generation logic as a possible location for said requested translation, where the size register comparison logic selects filtered TLB memory locations where the accessed size registers indicate that the translation stored at the corresponding TLB memory location matches the size used by the index generation logic to identify the possible location; and lookup logic operable upon receiving a translation request to look up entries in the TLB memory and return translations which match the translation request where the lookup logic accesses only the filtered TLB memory locations.

12. A method for translating a virtual memory address into a physical memory address, the virtual memory address comprising an offset for a variable size memory page, an index and a virtual tag, physical address page numbers being stored in a memory array having an indexed plurality of elements, each element for storing a physical address page number and an associated tag corresponding to the virtual tag, memory page size being stored in an associated register array having an indexed plurality of registers, each register corresponding to an element in the memory array and for storing a page size associated with a physical address page number and tag in the corresponding element, the registers being adapted for parallel indexing, the method comprising:

determining possible indices, each possible index corresponding to a possible page size for the virtual memory address;

selecting, in parallel, candidate page sizes from stored page sizes that match the possible page size corresponding to the determined possible index;

looking up a tag and physical address page of a candidate page size in the memory array at the corresponding index; and determining a physical memory address from the tag, physical address page number and respective offset when the selected tag matches the virtual memory address.

13. A method according to item 12 further comprising, where there is no matching tag and virtual memory address, deselecting the candidate page size and performing selecting and determining again.

14. A method according to item 13 further comprising repeating deselecting, selecting and determining until there is a matching tag or until there are no selected candidate page sizes.

15. A method according to item 12 further comprising fetching the physical address page from selected memory element before the tags are matched.

16. A method according to item 12 further comprising fetching the physical address page from selected memory element after the tags are matched.

17. A method according to item 12 further comprising sending a translation miss signal when no tags are matched.

18. A method for translating a virtual address into a physical memory address, the virtual address comprising an offset for a variable size memory page, an index and a virtual tag, physical address page numbers being stored in a memory array having an indexed plurality of elements, each element for storing a physical address page number and an associated tag corresponding to the virtual tag, memory page size being stored in an associated register array having an indexed plurality of registers, each register corresponding to an element in the memory array and for storing a page size associated with a physical address page number and tag in the corresponding element, the registers being adapted for parallel indexing, the method comprising:

determining TLB index for each page size from virtual address;

looking up size stored at each index in parallel and comparing with the size that generated the index whereby matches are candidates;

returning a TLB miss when there are no candidate sizes that have not been looked up;

looking up tag and data of the smallest candidate size that has not been looked up; and determining a physical address from the selected cache data when the tag matches the virtual address and returning a TLB hit otherwise performing looking up tag and data when there are further candidate sizes that have not been looked up.

19. A method for translating a virtual memory address into a physical memory address, the virtual memory address comprising an offset for a variable size memory page, an index and a virtual tag, the method comprising:

determining possible indices, each possible index corresponding to a possible page size for the virtual memory address;

selecting, in parallel, candidate page sizes from stored page sizes that match the possible page size corresponding to the determined possible index;

looking up a tag and physical address page of a candidate page size in a memory array at the corresponding index, physical address page numbers being stored in the memory array having an indexed plurality of elements each for storing a physical address page number and an associated tag corresponding to the virtual tag; and determining a physical memory address from the tag, a physical address page number and respective offset when the selected tag matches the virtual memory address.

20. A method according to item 19 further comprising, where there is no matching tag and virtual memory address, deselecting the candidate page size and performing selecting and determining again.

21. A method according to item 20 further comprising repeating deselecting, selecting and determining until there is a matching tag or until there are no selected candidate page sizes.

22. A method according to item 19 further comprising fetching the physical address page from a selected memory element before the tags are matched.

23. A method according to item 19 further comprising fetching the physical address page from selected memory element after the tags are matched.

24. A method according to item 19 further comprising sending a translation miss signal when no tags are matched.

25. A method for translating a virtual address into a physical memory address, the virtual address comprising an offset for a variable size memory page, an index and a virtual tag, the method comprising:

determining TLB index for each page size from virtual address;

looking up size stored at each index in parallel and comparing with the size that generated the index whereby matches are candidates;

returning a TLB miss when there are no candidate sizes that have not been looked up;

looking up tag and data of the smallest candidate size that has not been looked up; and determining a physical address from the selected cache data when the tag matches the virtual address and returning a TLB hit otherwise performing looking up tag and data when there are further candidate sizes that have not been looked up.

It will be clear to one skilled in the art that many improvements and modifications can be made to the foregoing example embodiments without departing from the scope of the present teachings.

What is claimed is:

1. A data processing apparatus for translating a virtual memory address into a physical memory address, the virtual memory address comprising an offset for a variable size memory page, an index and a virtual tag, wherein the index is provided at a different bit position of the virtual memory address dependent on a size of the memory page, the apparatus comprising:
   a translation lookaside buffer (TLB) memory array having an indexed plurality of storage elements, each storage element for storing a physical address page number and an associated tag corresponding to the virtual tag;
   a size register array having an indexed plurality of size registers, each size register corresponding to a storage element in the TLB memory array and for storing a page size value associated with the physical address page number and associated tag stored in the corresponding storage element, the size register array being adapted for parallel indexing;
   index generation logic for determining, dependent upon a possible page size, possible indices of the virtual memory address, and for determining corresponding possible offsets and possible virtual tags of the virtual memory address, each possible index, virtual tag and offset corresponding to the possible page size for the virtual memory address and comprising different bit positions of the virtual memory address;
   comparison logic for selecting, in parallel, candidate page sizes from stored page sizes in the size register array that match the possible page size corresponding to each determined possible index, each candidate page size determining a corresponding candidate index;
   lookup logic for looking up an associated tag and physical address page of a candidate page size in the TLB memory array at each corresponding determined candidate index; and
   translation logic for calculating a physical memory address when the looked up associated tag matches the possible virtual tag determined from the virtual memory address for the candidate page size, the physical memory address being based on the looked up physical address page and a matched possible offset of the virtual memory address corresponding to the matched candidate page size.

2. The data processing apparatus according to claim 1, further comprising a controller for, when the looked up associated tag does not match the virtual tag determined from the virtual memory address, deselecting the candidate page size for the looked up associated tag and having the look up logic performing lookup again for another candidate page size.

3. The data processing apparatus according to claim 1 further comprising two or more memory array ways, associated register arrays, comparison logic and lookup logic operating in parallel and adapted to provide the physical address page value.

4. The data processing apparatus according to claim 3 wherein each memory array way is adapted to operate independently whereby different candidate page sizes can be used for tag lookup and deselected in each parallel operation.

5. The data processing apparatus according to claim 1 wherein the data processing apparatus is a translation lookaside buffer in a central processing unit memory management unit.

6. The data processing apparatus according to claim 1 wherein the data processing apparatus is a translation lookaside buffer in a standalone memory management unit.

7. The data processing apparatus according to claim 1 wherein the size register array comprises bits for all possible page size.

8. The data processing apparatus according to claim 1 wherein a selected page size can be 4 KB requiring 12 offset bits, 8 KB requiring 13 offset bits or 2^N KB requiring 10+N offsets bits optionally having an upper limit of 128 MB page size requiring with a 27 bit offset.

9. The data processing apparatus according to claim 1 whereby each size register is a flip flop circuit.

10. The data processing apparatus according to claim 1 wherein the size register array is implemented in a RAM structure with multiple read ports.

11. Apparatus for data processing configured to translate a virtual address into a physical address, the virtual address comprising an offset for a memory page, an index and a tag, the memory page having a variable size and the index being provided at a different bit position of the virtual address dependent on a size of the memory page, the apparatus comprising:
   a translation lookaside buffer (TLB) memory for storing translations, where the TLB memory includes a plurality of locations, where each translation is stored in one of a subset of the TLB memory locations, and where the subset of the TLB memory locations is dependent upon the size of the memory page associated with the translation;
   size registers, where a size register is associated with each TLB memory location, and where a greater number of the size registers can be accessed simultaneously than the TLB memory locations;
   index generation logic operable to calculate indices of possible locations where a requested translation might be stored in the TLB memory for each memory page size, where the size used by the index generation logic to identify the possible location indicates different bit positions of possible indices in the virtual address;
   size register comparison logic operable to access the size registers associated with each TLB memory location identified by the index generation logic as a possible location for said requested translation, where the size register comparison logic selects filtered TLB memory locations where the accessed size registers indicate that the translation stored at the corresponding TLB memory location matches the size used by the index generation logic to identify the possible location; and
   lookup logic operable, upon receiving a translation request, to look up entries in the TLB memory and return translations which match the translation request, where the lookup logic accesses only the filtered TLB memory locations.

12. A method for translating a virtual memory address into a physical memory address, the virtual memory address comprising an offset for a variable size memory page, an index and a virtual tag, wherein the index is provided at a different bit position of the virtual memory address dependent on a size of the memory page, the method comprising:
  determining possible indices, offsets and virtual tags of a virtual memory address, each possible index corresponding to a possible page size for the virtual memory address and comprising different bit positions of the virtual memory address;
  selecting, in parallel, candidate page sizes from stored page sizes that match the possible page size corresponding to each determined possible index, each candidate page size determining a corresponding candidate index;
  looking up an associated tag and physical address page of a candidate page size in a memory array at each corresponding candidate index, the memory array having an indexed plurality of elements, each element for storing a physical address page number and an associated tag corresponding to the virtual tag; and
  determining a physical memory address from the associated tag, a physical address page number and a respective offset when a selected associated tag matches a possible virtual tag determined from the virtual memory address.

13. A method according to claim 12, further comprising, where there is no matching associated tag and virtual tag determined from the virtual memory address, deselecting the candidate page size and performing selecting and determining again.

14. A method according to claim 13, further comprising repeating deselecting, selecting and determining until there is a matching tag or until there are no selected candidate page sizes.

15. A method according to claim 12, further comprising fetching the physical address page from a selected memory element before the associated tag and corresponding virtual tag are matched.

16. A method according to claim 12, further comprising fetching the physical address page from selected memory element after the associated tag and corresponding virtual tag are matched.

17. A method according to claim 12 further comprising sending a translation miss signal when no tags are matched.

18. A method for translating a virtual address into a physical memory address, the virtual address comprising an offset for a variable size memory page, an index and a virtual tag, wherein the index is provided at a different bit position of the virtual address dependent on a size of the memory page, the method comprising:
  determining a translation lookaside buffer (TLB) index for each page size from the virtual address, the TLB index for each page size stored at a different bit position of the virtual address;
  looking up sizes, stored in a cache, for each determined TLB index in parallel, and, for each TLB index, comparing the cache sizes with the size that generated the TLB index to determine a matching candidate size;
  returning a TLB miss when there are no matching candidate sizes; and
  looking up an associated tag and data, stored in the cache, for each matching candidate size; and, when the associated tag matches the virtual tag of the virtual address, determining a physical address, from the cache data and the offset of the virtual address, and returning a TLB hit.

* * * * *